Dec. 24, 1935.　　　K. NÜCHTERLEIN　　　2,025,609
REFLEX CAMERA
Filed Jan. 2, 1935　　　5 Sheets-Sheet 3

Inventor
KARL NÜCHTERLEIN
By Chas K. Davis
Attorney

Patented Dec. 24, 1935

2,025,609

UNITED STATES PATENT OFFICE 2,025,609

REFLEX CAMERA

Karl Nüchterlein, Dresden, Germany, assignor to Ihagee Kamerawerk Steenbergen & Company, Dresden, Germany Application January 2, 1935, Serial No. 133

19 Claims. (Cl. 95—42)

My present invention relates to improvements in reflex cameras of the roll film type employing a shutter arranged immediately in front of the light sensitive layer or surface of the film; and the invention involves, in combination with film feeding mechanism, setting mechanism, and shutter operating mechanism, also the use of a combined delay-action and exposure-timing mechanism, together with other features of construction and operation.

In carrying out my invention I employ automatically operating parts that are spring controlled, for either high speed work and instantaneous exposures, or for low speed operations and delayed, or timed exposures.

A single operating knob is manually turned to wind the film roll and automatically set the shutter mechanism and a part of the reflex system of the camera, and a second operating knob is manually turned to wind a spring-motor and accessories for the delay-action and exposure-timing mechanism.

The delay-action and exposure-timing mechanism are here illustrated as co-acting with an automatically operated reflecting mirror which is located to swing into and out of line with the optical axis of the camera, but it will be understood that any other suitable element of the camera may be utilized in combination with the desired mechanism for co-action with the delay-action and exposure-timing mechanism.

In my present invention I provide, in place of the separate driving or delay-action and exposure-timing mechanism heretofore employed, a combined delay-action and exposure-timing or retarding mechanism in which the delay-action and the exposure-timing devices for low speed work are controlled in common by a single mechanism that is set by turning the second knob referred to, and this mechanism, as before stated, is illustrated in connection with the focusing or reflecting mirror that is alined with the optical axis of the camera before exposure, and is removed therefrom to make the exposure.

The shutter mechanism is released by an operating lever, and the latter may be actuated by pressure on a button, by pneumatic pressure, or in other suitable manner.

In the accompanying drawings I have illustrated one complete example of the physical embodiment of my invention wherein the parts are combined and arranged according to one mode now in successful operation, but it will be understood that various changes and alterations may be made in the exemplified structure, within the scope of my appended claims, without departing from the principles of my invention.

Figures 1, 3, 4:
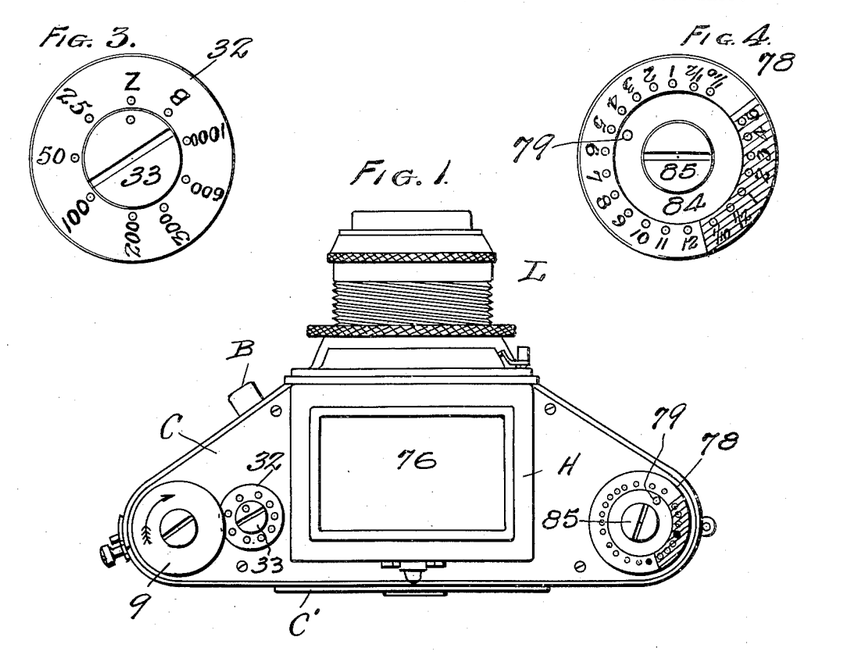
Figure 1 is a plan view of the camera.
Figure 3 is an enlarged view of the high-speed setting button.
Figure 4 is an enlarged plan view of the low speed setting device, for delay-action and timing exposure.

In order that the general assembly and arrangement of the camera may readily be understood I have shown the camera in Figure 1 with an outside cover or casing C that is provided with the usual hinged back-wall or plate C' to give access to the interior of the camera (Fig. 2) for loading and removing the film F. As shown herein, the camera is of trapezoidal shape with the lens mount L at the front thereof, and exposures may be made by applying pressure at B, Figure 1, either by manual pressure direct, or by the use of a pneumatic device or bulb, as usual.

A spring actuated focusing hood is indicated as a whole by the letter H, and the details of construction and operation of this hood are illustrated in my co-pending application Serial Number 759,999 filed December 31, 1934.

The interior frame or frame plates of the camera are designated as I, and these parts are employed for the support of the several parts of the operating mechanisms. The film F (dotted lines Figure 6) is to be unwound from the film roll G and wound upon the winding roll or spool W. The film and the two spools are of standard type, and the spools or rolls are mounted in chambers G' and W' respectively that are separated from the intermediate light chamber A of the camera. The film is passed across the back or rear portion of the camera with its sensitized surface in line with the optical axis of the lens.

The shutter is located and operates in front of the sensitized film in a plane parallel with the film and in the back of the light chamber A.

The shutter comprises two curtains 1 and 2 which are designed to flash across chamber A for an exposure, and the film of course remains stationary during exposure, and is wound on its spool W after each exposure and during the setting of the camera for the next exposure, the usual numbers being employed as signals on the back of the film and observed through the usual sight window of the hinged back-wall C'.

Each curtain has one end attached to a shutter roller as 3 and 4, and each curtain is provided with a pair of tapes or extensions 5 and 6, the tapes 5 of the first curtain being attached to the shutter roller 3 and the opposite end of this curtain is attached to an automatic, spring-wound-roller 7 similar in character to a window shade roller, the roller 7 being journaled in the frame plates I. The second curtain of the shutter, 2, is attached at one end to the shutter-roller 4, and the tapes 6 of this curtain are attached to the automatic spring-wound-roller 8.

Figure 10:
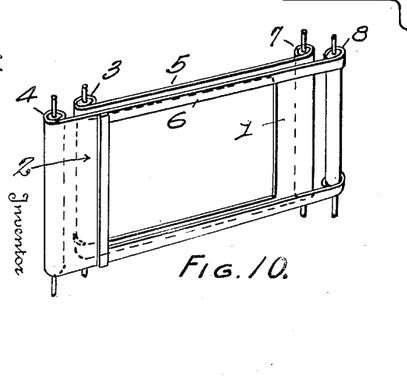
Figure 10 is a perspective view showing the two curtains forming the shutter, which is open for exposure.

By turning the knob 9 both curtains are wound on the shutter rollers 3 and 4; when the shutter is released, the curtain 1 starts first to wind upon its roller 7 exposing an opening between its tapes, as indicated in Figure 10, and then the second curtain follows, when permitted to do so, to close the exposure, and the second curtain is wound on its spring-roller 8.

After the camera has been loaded by placing the film-roll in chamber G', the free end of the film is attached to the spool W in its chamber W', and then spool W is simultaneously turned with shutter-rollers 3 and 4 to wind the film on the spool, and to wind the curtains on their rollers. The winding of the film and the winding of the curtains are accomplished through the turning of the knob 9, which has a short shaft 10 journaled to turn in a bearing of one of the plates I, and the end of this short shaft terminates in a socket head 11 to receive the pin 12 of the spool W.

In addition to the simultaneous winding of the film and the curtains, it will be apparent that the spool W must also be turned beyond the movement for winding the curtains on the shutter-rollers. Provision is made for this independent turning of the knob and winding of the film on its spool, beyond the set position of the curtains, by interior construction of the winding knob 9, which includes a friction coupling of the knob with its shaft, and with the power transmission mechanism to the shutter-rollers. The knob is fashioned with a spaced inner sleeve 13, and a resilient coupling or coiled spring 14 is coiled about the sleeve, with one end of the spring anchored to the knob, and the other end 15 fixed in a hole of the main drive gear 16 of the power transmission mechanism to the shutter-rollers. The main driving gear is mounted concentrically with the axis of the shaft, and is loose thereon, and this gear is fashioned with an annular skirt 17 forming a recess in which a friction brake-spring 18 is seated, said spring comprising one coil in frictional contact with the skirt 17 and having one end 19 extending transversely through and fixed in the shaft 10.

It will thus be apparent that by turning the knob 9, even after the two curtains have been properly wound on their shutter-rollers, the winding spool W may be turned, because of the fact that the frictional engagement of the coils or the spring 14 with sleeve 13 may be overcome by a slight increase in the energy required for turning the knob 9, while the spring 14 remains stationary. By this additional movement of the knob, the film F may be wound upon the winding spool W regardless of the shutter winding mechanism, as required at various times in the operation of the camera.

The brake spring 18 tends to stabilize the connection between the knob and the main drive gear 16, and reverse movement of the latter is prevented by the usual spring pressed pawl or dog 17a, which permits clockwise movement of the knob, but prevents anti-clockwise movement thereof, and also of the main drive wheel 16 with which it is engaged.

A gear plate 19 having an anchoring ring 20 is mounted concentrically with and surrounds the skirt 17 of the main gear 16, and this gear plate is capable of oscillation with the skirt as a center, and adapted to swing on the axis of the shaft 10.

The plate is pulled in one direction by the spring 22 that is attached at one end to the pin 23 of the plate, and the other end of the spring is attached to one of the frame plates I. The gear plate is located at the outside of the frame plate I and the latter has a slot 24 in which the pin 23 moves as the spring 22 pulls the gear plate into position for winding the shutter rollers 3 and 4.

The meshed transmission pinions 25 and 26 are journaled in bearings on the outer face of the gear plate, and pinion 25 which is in permanent engagement with the gear 16 transfers power from the gear to the pinion 26, which, in turn, is alternately engaged with and disengaged from the large setting gear 27 that meshes with the shutter pinion 28 of the shutter-roller 3 of the #1 curtain of the shutter.

The setting gear 27 has a complementary concentric gear 29 that engages the second shutter gear 30 of the shutter-roller 4 of the #2 curtain, and both the gears 27 and 29 are mounted on the gear shaft 31 that is journaled in bearings of a frame plate I. This shaft is disposed in a plane parallel with the winding spool W, and one end of the gear shaft projects through the frame plate, but the two shutter gears are enclosed within the cover C or casing of the camera.

A speed ring or shutter-setting dial in the nature of a hollow circular disk, 32, is loosely mounted to slide and turn on the outer projecting end of the gear shaft 31. The upper, unexposed face of the disk bears the notations and data for the timing at high speed exposures in fractions of seconds as .25, .50, .200, .300, .400, .600, and .1000. The letter B on the disk also indicates the use of a bulb for short-time releasing of the shutter. With the shutter set at B on the ring, the button B may be pressed, manually to release curtain #1 and the exposure continues as long as pressure is applied, but exposure is closed, when the pressure is released thereby releasing the #2 curtain of the shutter.

When the shutter is set at Z on the ring and pressure is applied to the button B, curtain #1 is released to make an exposure, and a second pressure is required to release the #2 curtain and close the exposure, thus making two distinct and separate movements of the shutter.

Each of the above timing notations has a point or mark, and any one of this annular series of nine points on the disk may be co-ordinated with another, relatively stationary, point on the cap 33 that is fixed in predetermined position in any suitable manner on the extreme end of the gear shaft and arranged concentrically with the disk 32. The disk has an annular recess in its upper face to accommodate the cap, and the latter is also recessed, at its upper side, to enclose a spring 34 interposed between the cap and the disk, and this spring tends to hold down the loose disk upon the shoulder 35 of the shaft 31, in relation to the cap. The disk may thus be pulled toward the end of the shaft against tension of spring 34 and turned on the shaft with relation to the cap.

A single timing and clutch pin 36 is fixed to the disk 32 and the pin projects below the lower face of the disk to be engaged in a selected one of the annular series of nine holes 37 located in the shutter gear 24. These holes correspond to the timing figures and letters, and their points, on the face of the speed ring or disk 32.

In adjusting the camera for a predetermined time exposure at high speed, the speed ring or disk is lifted against the tension of the spring 34, and then the disk is turned to bring one of the series of points (as B) into register with the complementary point of the fixed cap 33. Then the disk is released, and pin 36, under tension of spring 34, is caused to enter or penetrate the selected hole 37, thus rigidly coupling together the speed ring and the first shutter roller or its gear 27.

After the speed ring has thus been adjusted, the camera is set by turning the knob 9 as described for winding both the film F on its spool W, and the two shutter curtains 1 and 2 on their shutter rollers or curtain rollers 3 and 4. These two curtain rollers are thus held against turning, as by automatic action of the spring-wound rollers 7 and 8, by the engagement of the transmission gear 16, pinions 25 and 26, gears 27 and 28, and the two shutter pinions.

To effect release of the shutter, the pinion 26 is disengaged from the shutter gear 27, and this action is accomplished by the swinging movement of the gear plate 19 on its axis, from set position to release position.

The swinging movement of the gear plate is actuated by means of an operating lever 38 which is pivoted at 39 on the inner side of a frame plate I with its flange 40 in position to be pressed against by either a button, or by pneumatic action applied at B on the front of the camera.

The operating lever 38 is held by a spring 41 with one end against the operating pin 23 of the gear plate, and it will be obvious that pressure against flange 40 will swing the operating lever on its pivot 39, and this lever, in frictional contact with pin 23, will swing the gear plate, and free the pinion 26 from the shutter gear 27.

To thus release the shutter mechanism for a short-time snap shot, bulb exposure, or other high speed operation, ony a single pressure is applied against the flange 40 of the operating lever; but for a time exposure when the speed ring is set at Z, one pressure is applied to the flange to open the shutter, and then a second pressure (manually applied) is used to close the shutter.

Figure 2:
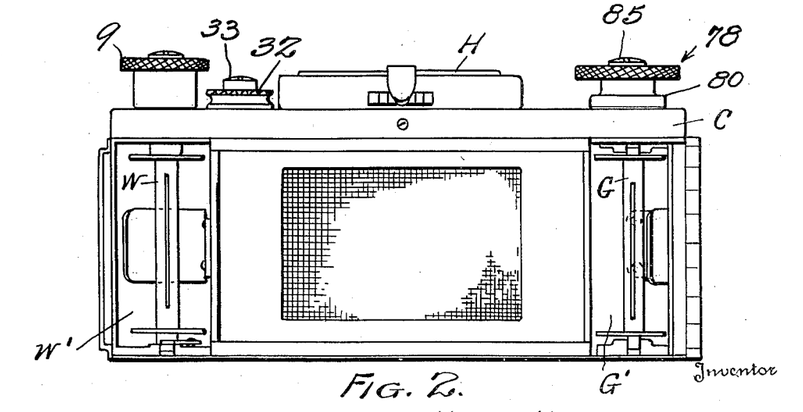
Figure 2 is a rear view of the camera with the hinged lid or back cover removed for convenience of illustration.

In the time-exposure where two successive pressures are applied to the operating lever, the first pressure releases curtain #1 of the shutter and the curtain is immediately wound upon its spring-roller 7 to open the shutter, as in Figure 10, and the second pressure applied to the operating lever, or to its flange 40 releases the second or #2 curtain, and this curtain is then immediately wound, automatically upon its spring-roller 8 to close the shutter as in Figure 2.

When making a time-exposure, on the first movement of the operating lever 38, the shutter gear 30 of the #2 curtain is locked and held by means of a spring detent 42 pivoted at 43, and the detent is limited in its movement by a stop pin 44 and a slot in the plate I. This detent is held in disengaged position by the push pin 45 fixed on the operating lever 38. As soon as the pin 45 is moved by the lever in slot 46 the spring detent 42 automatically moves into the path of a pin 47 on the shutter gear 29 and stops the movement of the gear.

A second spring detent 48 is also pivoted at 43, at the opposite side of the push pin 45 for engagement with the shutter gear 29 of curtain #2, and these two detents form an escapement device for the shutter gear in connection with pin 47, one detent being engaged while the other detent is disengaged.

On the second pressure against lever 38 for the time exposure, the detent 48 is disengaged and the detent 42 again moves into the path of pin 47, but the interval of time required for this movement prevents detent 42 from engaging the pin 47 and the gear is free to revolve. The automatic spring-roller 8 is now free to wind the second curtain to close the exposure.

In the light chamber A, between the shutter and the lens, an interior, automatically operating reflecting and focusing mirror 48 is hinged to swing into and out of line with the optical axis of the camera, and here shown, this mirror is employed as the operative connection between the high-speed mechanism and the low-speed mechanism located at opposite sides or ends of the camera.

When in light reflecting and focusing position this interior camera-mirror is disposed at an angle of approximately forty five degrees to the optical axis of the camera, and another mirror 76 (shown out of position and out of use in Figure 1) disposed in parallelism with the mirror 48 and exterior of the camera, is employed for observations.

When out of focusing and reflecting position the mirror 48 is held in a plane approximately parallel with the optical axis of the camera to form a closing wall for the light chamber, and a cap, as usual, is placed on the front of the lens to prevent rays of light reaching the chamber A through the lens. The mirror 48 is automatically swung into reflecting and focusing position between the shutter and the lens, as the knob 9 is turned to set the shutter mechanism preparatory to an exposure. Before the shutter can be released however, the mirror must be removed from the line of the optical axis of the camera.

and this removal of the mirror is accomplished through the action of the operating lever 38, to permit direct passage of light rays through the lens to the light chamber A and to the exposed film F.

The mirror is hinged at 49 in the side walls of the light chamber A, and a spring 50 tends to swing the mirror out of line with the optical axis of the camera and into non-reflecting position.

A cushioned stop 51 (dotted lines Fig. 11) is hinged at the front of the light chamber in the path of the free end of the mirror to limit its upward swing in non-reflecting position, and a ground glass plate 52 forming a focusing screen is fixed in the camera between the mirror 48 and the mirror 76, and this plate forms a wall of the light chamber.

The image or object to be reflected and photographed is reflected from the mirror 48 to the focusing screen, and the image may be observed without distortion and clearly and distinctly outlined in the ground glass screen, provided the hood H is unfolded.

Figure 5:
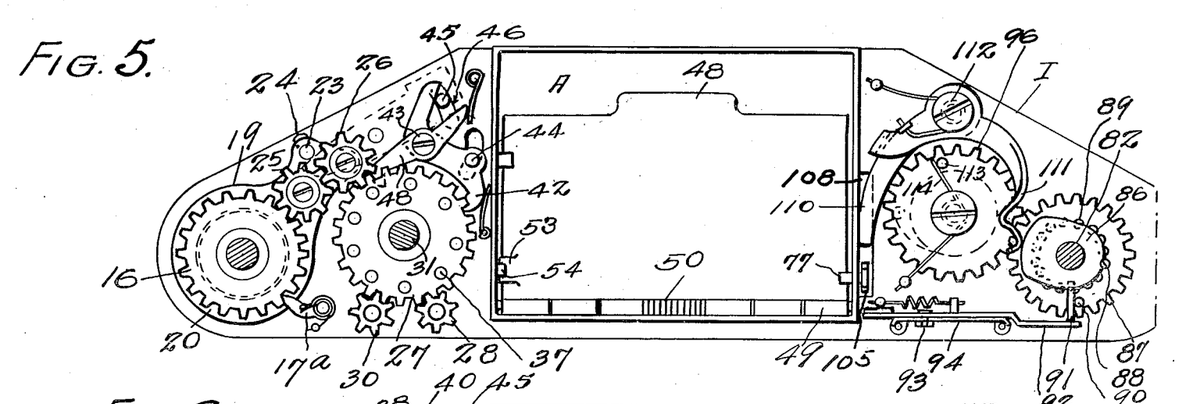
Figure 5 is an enlarged plan view with parts in section, with the case or cover removed, showing the operating parts at opposite ends of the camera and the focusing mirror therebetween, the shutter mechanism being set and the low speed mechanism also being set.
Figure 6:
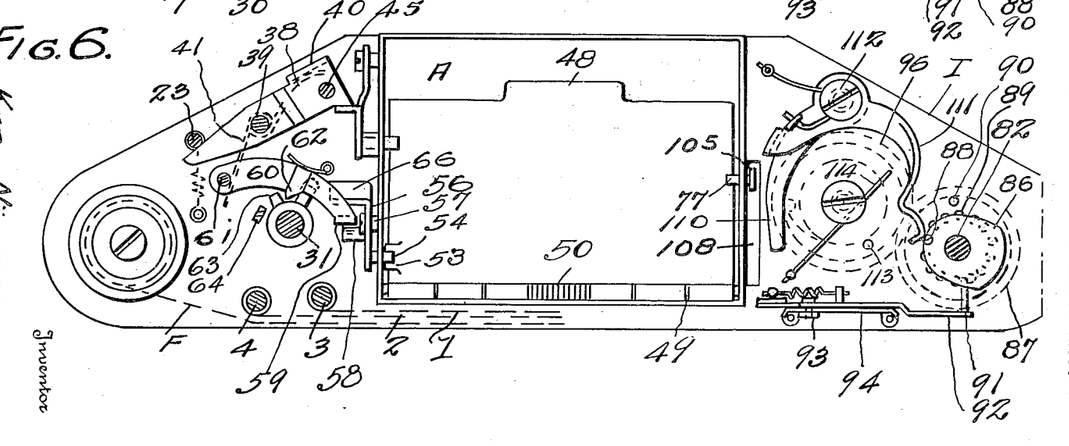
Figure 6 is a view similar to Figure 5, but showing the low speed mechanism in operation, or about to operate.
Figure 7:
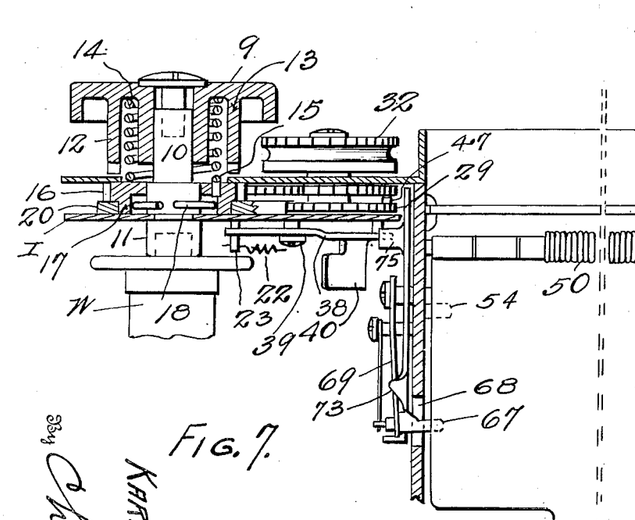
Figures 7 and 8 are complementary views in a plane at right angles to Figures 5 and 6, showing some parts in section and others in elevation.

As best seen in Figures 5 and 6, the mirror 48 has a lug 53 fixed at its lateral edge adjacent the shutter setting mechanism, and a pin 54 extending through an arcuate slot 55 in a wall of the light chamber A, bears at all times against this lug, and urges the mirror toward its focusing or reflecting position, against the tension of the mirror spring 49.

The pin 54 is rigidly mounted on one side of an oscillatable or rotary plate 56 which is pivoted at 57 on one wall of the chamber A and exterior of the chamber. Another, oppositely extending pin 58, is fixed on the other side of the plate 56 and this latter pin engages a flange 59 integral with a spring lever 60 which is pivoted at 61 on the frame I in a plane at right angles to the plane of the oscillatable plate, adjacent the rotary shaft 31, and between said shaft and the operating lever 38.

The lever 60 is fashioned with a catch or cam hook 62 that is located in the path of movement of a locking lug 63 fixed to rotate with the gear shaft 31, and a stop 64 on the plate I limits the shaft to one complete rotation. As seen in Figure 6 the latch 60 and lug 63 are holding the shaft against rotation and thereby preventing the release of the shutter while the mirror 48 is in focusing position and held in that position by pin 54 in engagement with the lug 53.

The mirror is swung to focusing position through the rotation or turning of shaft 31, as knob 9 is turned, through the engagement of a lug 65 on the shaft with a lug 66 rigid with the oscillating or rotary plate 56, which lug or flange 66 is located in the path of movement of the rotating lug 65 of the shaft 31. This engagement of the lug 65 and flange 66 turns the oscillating plate 56, and its pin 54, bearing on the lug 53 of the mirror, swings the latter to focusing position. When the mirror has swung to focusing position, it is caught by means of a retaining lug 67 in a side wall of the light chamber A, and the lug engages the face of the mirror at one of its lateral edges. This lug 67 is mounted at the free end of a spring blade 69 which is secured by screws 70 to the side wall of chamber A.

To release the mirror from its focusing position, the spring blade is flexed and the lug 67 thereof is disengaged from the mirror and withdrawn through the hole 68 in the side wall of the light chamber. For the purpose of flexing the blade I employ an L-shaped spring actuated cam lever 71 pivoted at 72, and located between the wall of the chamber A and the spring blade. The lever 71 has a cam face 73 in contact with the underside of the spring blade, and a long arm 74 that projects, at its end, through a slot in the frame I. This long arm of the lever is fashioned with a flange 75, which flange is located in the path of movement of one end of the operating lever 38. Thus, at the first or initial pressure against the flange 40 of the operating lever and upon the initial movement of the lever, the lug 67 is withdrawn from the mirror 48; spring 50 swings the mirror out of focusing position, plate 56 is swung on its pivot, pin 58 in contact with flange 59 swings catch 60, and the shaft 31 is thereby released to permit release action of the shutter.

The foregoing description relates specifically to the high speed mechanism and its operation, and in combination with this mechanism I employ a low-speed mechanism located at the right end of the camera, as in Figures 1, 5, 6, and 8, it being understood that the high speed mechanism can be used without the low-speed mechanism. By the employment of the low speed mechanism, however, I am enabled to precisely control the shutter action for either a delay-action of the shutter before exposure, or for a delay action of the second curtain of the shutter to insure a time exposure. By the use of the low-speed mechanism I am enabled, automatically, to delay the shutter for a predetermined time, and also to automatically expose the film for a predetermined time, i. e. to make a predetermined time-exposure.

These periods of delay before exposure and of time-exposure, are controlled by means of a detent 77 of the low-speed mechanism that cooperates with the hinged focusing mirror 48, the movement of the mirror to non-reflecting position, as heretofore explained, being necessary before an exposure can be made.

When the low speed mechanism is not in use, this detent 77 is disengaged from and free of the mirror, but when the low speed mechanism is to be employed, the detent is swung to operative position through the instrumentality of a setting knob 78 mounted on the camera at the opposite end thereof to the position of the setting knob 9, and intermediate devices.

As indicated in Figure 4 the knob 78 has two contrasting zones, the larger one being provided with a scale in seconds and fractions thereof from $\frac{1}{5}$ to 12 seconds for periods of time during which the exposure is to be made. This knob or speed ring may be adjusted by turning, to register a selected dot with a single dot 79 on the knob, and as a result of the adjustment in Figure 4 a timing-period of 5 seconds elapses after the first curtain is released and before the second curtain is released to make an exposure and close the shutter.

In the shorter, contrasting zone on the speed ring of the knob 78 a scale is shown from $\frac{1}{5}$ of a second up to 6 seconds, and a selected mark of this scale may be registered with dot 79, for an adjustment of the low speed mechanism whereby, after the first curtain is released as heretofore described, the detent 77 is caused to delay the removal of the mirror for a period of say six seconds before the first curtain is permitted to wind up on its spring roller to open the shutter and make an exposure, thus causing a delay-action before exposure. Thereafter, the second curtain is released to close the shutter, as has been predetermined by the operating mechanism.

When the low speed mechanism is in use the camera operates regardless of the position of the scale on knob 9, except that the knob 9 should register with the Z mark as in Figure 3.

Figure 8:
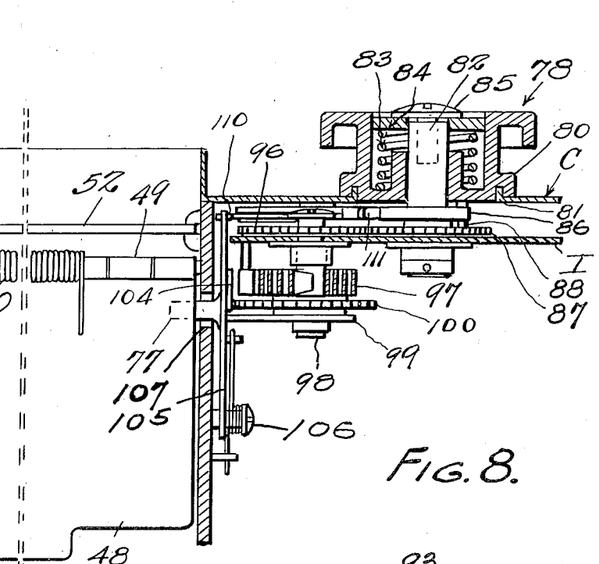

As seen in Figure 8 the knob 78 is of cylindrical hollow, shape, and fashioned with a grooved flange 80 which is mounted to turn upon the annular flange 81 of the cover plate C, and the knob also turns on the rigid post 82. A spring 83 is enclosed within the hollow knob and interposed between the bottom of the knob and a cap plate 84 on which the dot 79 is imposed, and a screw 85 fastens the cap plate rigidly to the post. As thus constructed it will be apparent that the knob 78 can be pulled out or upwardly in Figure 8 against the tension of spring 83 in order that the knob may be turned on the post as a center for adjustment with relation to the dot 79.

On the post between the casing C and one of the frame plates I, are located a cam disk 86 and a main gear 87, the cam disk, like the knob 78, being loosely journaled on the post, while the gear is rigid with the post and turns therewith, and the knob is provided with a rigid pin 88. This pin rigidly engages an edge notch of the cam, and the free end of the pin is adapted to be inserted in one of the holes or sockets 89 which are arranged in the face of the gear 87 complementary to the marks of the two scales appearing on the face of the speed ring or knob 78. Thus it will be apparent that the knob may be pulled outwardly to disengage pin 88 from a socket 89, the knob then turned on its center to bring a selected one of the dots of the two scales shown in Figure 4 into register with the dot 79. When the knob is thus adjusted the clutch pin 88 is permitted to be plunged into a socket by action of the spring 83. In thus predetermining the time for the exposure, or predetermining the delay-action in seconds, the knob, pin, disk and gear are all rigid with the post and they are turned for setting the low-speed mechanism.

Figure 9:
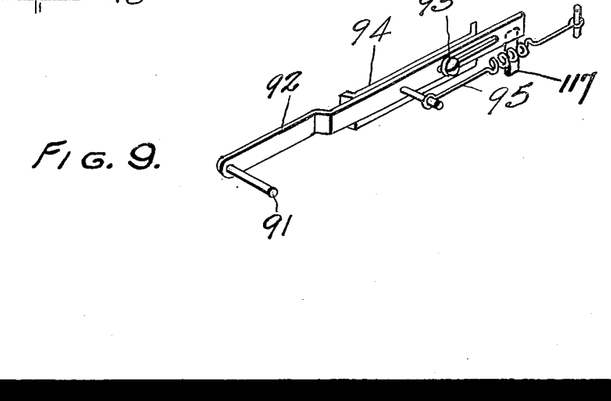
Figure 9 is a detail perspective of part of the delay-action and timing-exposure mechanism.

The knob is turned clockwise, one revolution, to wind a spring-motor, and the rotary movement of the main gear 87 is limited the one revolution by means of a stop pin 90 on the gear which contacts with an abutment or pin 91 that is adapted to project into the space between the cam or eccentric and the gear 87 for this purpose. The abutment pin 91, as best seen in Figure 9 is mounted rigidly on a slide blade 92, and the latter is slidably supported by a pin or bolt 93 on the bracket plate 94, the pin being engaged in a slot of the blade.

A spring 95 having one end anchored to the slide plate or blade and its other end anchored to a frame plate I, holds the slide blade and its pin in retracted position. This abutment pin it will be noted is located in the path of movement of the clutch pin 88, and when pin 88 contacts with pin 91 the rotation of the cam disk and gear 87 is gradually retarded and stopped to permit release of the second curtain of the shutter for terminating the exposure period. Thereafter, when knob 78 is again turned, the pins 88 and 91 are separated and the spring 95 returns blade 92 and its pin 91 to the position shown in Figures 5 and 6.

By means of one revolution of the knob 78 after it has been adjusted for a predetermined purpose, and through the use of a transmission gear 96 in mesh with the main drive gear 87, a spring motor is wound and is designed to revolve the knob in reverse direction as the spring-motor unwinds, during the predetermined period for which the mechanism has been set. The motor includes a helical spring 97 and this spring together with the transmission gear 96 are mounted on a shaft 98 that is journaled in suitable manner in the camera frame and in a bracket 99 mounted in the frame.

One end of the coiled spring is anchored to a support as the frame plate I, and the other end of the flat spring is fastened to the shaft 98 in order that the coiled spring may be wound anti-clockwise when the knob 78 is turned clockwise, and these rotary movements of the parts are reversed when the spring motor is permitted to operate or unwind.

Figures 13, 14, 15:
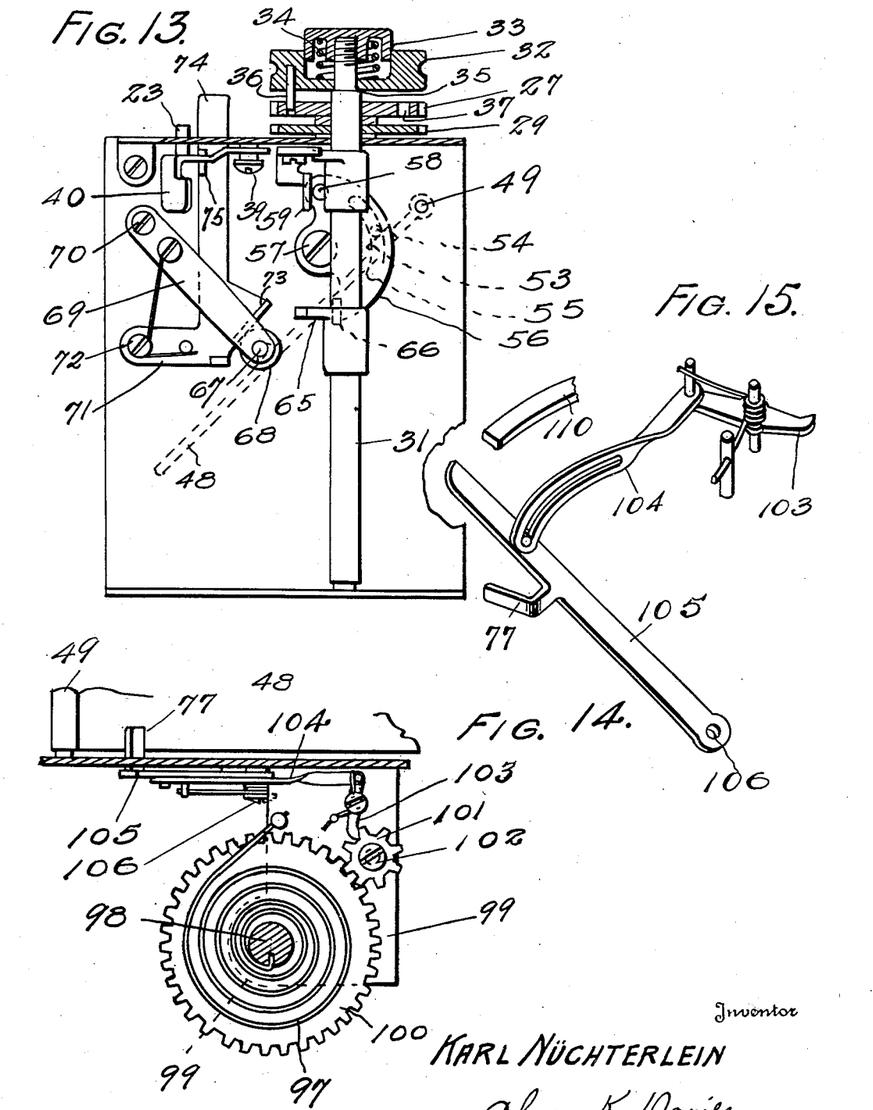
Figure 13 is a detail with parts in section looking from the left in Figure 7.
Figure 14 is an enlarged detail view of the spring-motor and its ratchet device.
Figure 15 is a perspective detail view of parts of the delay-action mechanism of the low-speed mechanism.

In Figure 14 a ratchet device is illustrated which permits the spring 97 to be wound and placed under tension and which also holds the spring under tension until the ratchet device is released to permit the spring motor to unwind. The ratchet device comprises a large gear 100 fixed on the shaft 98, and a smaller ratchet pinion 101 journaled at 102 on the bracket 99 and in engagement with the gear. A spring pressed pawl 103 which engages the ratchet pinion, is connected by a slotted link 104 to a pivoted lever 105 that is pivoted at 106 on the exterior face of one of the walls of the light chamber.

For releasing the ratchet I provide the spring pressed lever on which is mounted the detent 77 which detent projects through a slot 107 in the side wall of the light chamber, and the free end of the ratchet lever 105 projects through another slot, 108, in the frame plate I.

A U-shaped, spring pressed escapement device comprising a spring detent 110 and a cam lever 111, which are co-axially mounted or pivoted on a common center 112 are located in the space between the outside casing of the camera and the frame plate I. The detent is designed for co-action with the free end of the ratchet release lever 105, and the cam lever is designed for co-action with the cam 86 with which it is constantly engaged.

A pin 113 on the transmission gear 96 co-acts with the spring 114 of this gear to cushion the movement of the gears.

Assuming that the film F is in proper position for an exposure; the hood H has been unfolded so that observations may be made of the image on the focusing screen or light screen 52 reflected from the mirror 48; and that the knob 9 has been wound to set the shutter release mechanism and swing the mirror into the line of the optical axis of the camera. For a delay action of say six seconds before the exposure takes place, the knob 78 or speed ring is set to that position, and then given one turn or revolution, which action winds the spring motor 97 and the motor is then held in wound position by the ratchet pawl 103, and the spring-actuated ratchet release lever 105, by its own spring, is swung to operative position as in Figures 5, 11, and 15. In this position the detent 77 of the lever is resting on the mirror 48, and the free end of the lever is spaced slightly away from the free end of the latch 110, as seen in Figures 5 and 15, but the latch is in the path of movement of the free end of the lever 105.

When the shutter mechanism is released by pressing on the operating lever 38, the mirror 48 is released from the detents 54 and 67 as heretofore described, and the spring 50 of the mirror swings the mirror sufficiently so that the lever 105, through detent 77 is swung into contact with the latch 110. This initial swing of lever 105 permits (through slotted link 104) the spring actuated ratchet-pawl 103 to automatically release the ratchet gear 100, thus releasing the spring motor which starts to unwind. Lever 105 contacts with latch 110 and is stopped thereby, holding the mirror, through detent 77 from swinging out of the optical axis of the camera for an exposure until the spring motor runs down. The cam 86 revolves and at the end of six seconds, the low point of the cam reaches the lever 111, permitting this lever to swing and carry with it the latch 110 to release the lever 105. Lever 105 now swings out of the way of the mirror and the latter automatically swings out of the line of the optical axis of the camera for the exposure. The first and second curtains of the shutter are now free to act, and the shutter performs its functions as previously provided for.

For a time exposure, without the delay action, the shutter mechanism and mirror are set as before explained. Now the speed ring 78 is set at say five seconds as in Figure 4 for a time exposure with the low speed mechanism controlling the exposure. The low side of the cam is now in touch with the lever 111 and the latch 110 is out of the path of the lever 105. The knob 78 is now turned to wind the spring motor. When the operating lever 38 is pressed to release the mirror and the shutter, the first curtain is flashed across the chamber A to open the exposure, but the second curtain is delayed in its action for five seconds by means of a ratchet device used in connection with the automatically spring wound roller 8 for the #2 curtain. This spring roller is provided with a pinion 115 that is engaged by a spring pawl 116, and a pin 117 is mounted on the slide plate or blade 92 for contact with and release of this pawl from its pinion. When the coupling pin 88, turning about its center, reaches the pin 91 the slotted blade 92 is moved to the right in Figure 6 so that arm 117 contacts with the spring pawl 116, thereby releasing the automatic spring roller 8, which causes the 2nd curtain to flash across the light chamber A and close the exposure after the lapse of five seconds in time, as before stated.

Figures 11, 12, 16:
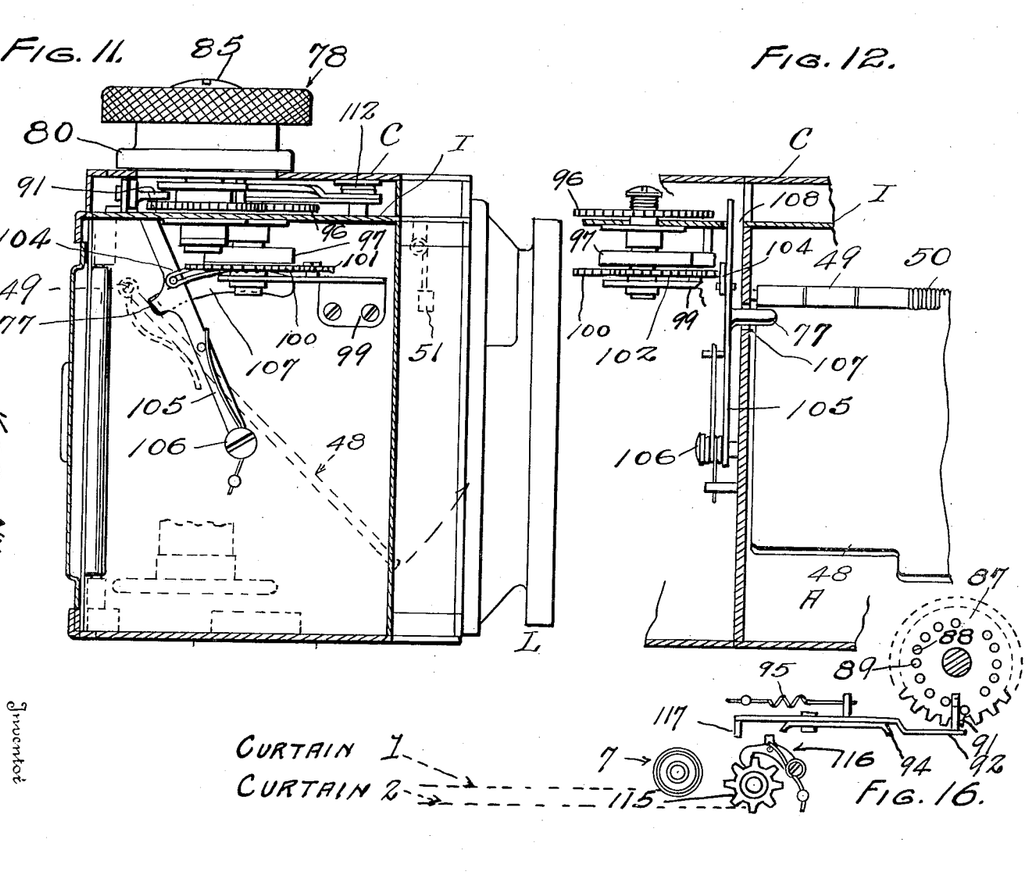
Figure 11 is a transverse view with parts in section and parts in elevation, looking from the right in Figure 8.
Figure 12 is a detail view with parts in section looking from the right in Figure 11.
Figure 16 is a diagrammatic view of the control mechanism for the curtains of the shutter.

When the spring motor "runs down" or just before it finishes unwinding, the pin 90 which has turned anti-clockwise with the gear 87 contacts with pin 92, and the slide blade 92 with its pin or lug 117 is drawn to the right in Figure 16, against tension of the spring 95 until the lug 117 contacts with pawl 116, and continued movement of the lug releases the pawl from the ratchet pinion 115 of the roller 8. The #2 curtain is now free to operate in connection with the shutter release of the high-speed mechanism. It will also be observed that before the low-speed mechanism, including the spring motor is "set" by turning the knob 78, the lever 105 occupies a position at the right end of the slot 107 in Figure 11, and that the detent 77 is out of reach of the mirror. Or if the lever 105 remains in position of Figure 11 with the detent 77 engaging the mirror, the mirror can still swing to non-reflecting position, when released by the high speed mechanism and while the low-speed mechanism is inoperative, because of the slotted link 104.

Thus the high-speed mechanism may be utilized irrespective of the low-speed mechanism, or the low speed mechanism, by the operation of setting the knob 78, may be brought into combination with the high speed mechanism.

It will be understood that the devices illustrated are merely one means for carrying out my invention, and that other means may be employed, changes and alterations may be made in the constructions and arrangements of parts, and various changes are contemplated from the exemplifying structures of the drawings, all within the scope of my appended claims.

Having thus fully described my invention what I claim as new and desire to secure by Letters Patent, is:—

1. In a camera, the combination with film feeding mechanism, shutter operating mechanism, and a spring-actuated mirror located in the line of the optical axis of the camera, of means for co-action with the mirror whereby a delay-action is accomplished before exposure is made by the shutter.

2. In a reflex camera including a spring-actuated mirror located in the line of the optical axis of the camera, film feeding mechanism, and shutter operating mechanism, means for opening the shutter for an exposure, means for closing the shutter after an exposure, and means under control of the mirror for delaying the closing action of the shutter.

3. In a camera, the combination with film feeding mechanism, two automatically operated curtains forming the shutter and operating means therefor, and a spring actuated mirror located in the optical axis of the camera, of means for releasing the first shutter to open exposure and means for releasing the spring actuated mirror, means under control of the mirror-release device for detaining the second shutter, and means for releasing said detaining means to close the exposure.

4. In a reflex camera including a spring-actuated reflecting mirror located in the line of the optical axis of the camera, the combination with film feeding mechanism, shutter operating mechanism, and means for releasing the mirror, of means under control of the mirror for actuating the shutter for an exposure, and means under control of the mirror for delaying the exposure of the shutter.

5. In a reflex camera including a spring actuated reflecting mirror located in the line of the optical axis of the camera, the combination with shutter operating mechanism, of means under control of the mirror for delaying the action of the shutter operating mechanism, and means for releasing the shutter operating mechanism after the delay action.

6. In a reflex camera including a spring actuated reflecting mirror in the line of the optical axis of the camera, the combination with a shutter comprising a pair of slit-curtains and operating means for the shutter, and means actuated by the shutter operating mechanism for removing the mirror to non-reflecting position, of means for delaying the action of the last mentioned means, means for releasing the first curtain after the delay action, and means for releasing the second curtain after the opening movement of the first curtain.

7. In a reflex camera including a spring-actuated reflecting mirror located in line with the optical axis of the camera, film feeding mechanism and means actuated thereby for removing the mirror to non-reflecting position, shutter operating mechanism and a pair of slit curtains forming the shutter, of time-setting mechanism for delaying the action of the first curtain, and means under control of the time-setting mechanism for delaying the action of the second curtain.

8. In a reflex camera as described and including a spring-actuated mirror located in obscuring position and disposed in the line of the optical axis of the camera, the combination with a motor and operating means therefor, of delay-action mechanism and time-exposure mechanism under control of said motor, means for releasing the spring actuated mirror, and means under control of the delay-action mechanism and the time-exposure mechanism for controlling the released movement of the mirror.

9. In a reflex camera including a spring actuated mirror located in obscuring position, the combination with a motor and operating means therefor, of delay-action means for the mirror, and means actuated by the motor for co-action with said delay-action means.

10. The combination in a reflex camera with a spring-operated mirror located in obscuring position, and means for releasing the mirror, of delay-action mechanism for a time-exposure comprising a motor and operating means therefor, controlling means for the motor and means responsive to movement of the mirror for releasing the controlling means.

11. The combination in a reflex camera with a spring operated mirror located in obscuring position, and means for releasing the mirror, of delay-action mechanism for an exposure comprising a motor, control means for the motor, and means located between the control means and in the path of movement of the spring operated mirror for releasing the control means.

12. The combination in a reflex camera with a spring operated mirror located in obscuring position, and means for releasing the mirror, of delay-action mechanism for an exposure comprising a motor, control means for the motor, a release lever for co-action with the control means, and a detent on said lever in the path of movement of the spring operated mirror.

13. The combination in a reflex camera with a spring operated mirror located in obscuring position and means for releasing the mirror, of delay-action mechanism for an exposure comprising a spring-wound motor, a control ratchet for the motor, a release lever and a slotted link connecting said lever and ratchet, and a detent on said lever in the path of movement of the mirror.

14. The combination in a reflex camera with a spring operated mirror located in obscuring position and means for releasing the mirror, of delay action mechanism for an exposure comprising a spring-wound motor, control means for the motor, means located between the mirror and the control means for releasing the control means, and means for setting the time for operation of the released motor.

15. The combination in a reflex camera with a spring operated mirror located in obscuring position and means for releasing the mirror, of delay-action mechanism before an exposure comprising a time-setting device, means for setting said device, a motor and means for setting the motor, control means for the motor, and means located between the mirror and the control means for releasing the control means.

16. The combination in a reflex camera with a spring operated mirror located in obscuring position and means for releasing the mirror, of delay-action mechanism before an exposure comprising a time setting device and operating means therefor, a motor, a single means for setting the device and setting the motor, control means for the motor, and means located between the mirror and the control means for releasing the latter.

17. The combination in a reflex camera with a spring operated mirror located in the obscuring position, of delay-action mechanism before an exposure comprising a manually operated time-setting device and motor, an automatic control for the motor, and means responsive to movement of the mirror for automatically releasing the control means.

18. The combination in a camera with an automatically operating element and release means therefor, of delay-action mechanism comprising a manually operated time setting device and a motor, an automatic control for the motor, and means responsive to the movement of the operating element for automatically releasing the control means.

19. The combination in a reflex camera with a spring operated mirror located in obscuring position and release means therefor, of a time-exposure mechanism comprising a manually operated time-setting device and a motor, an automatic control for the motor, and means located between the motor control means and the mirror for releasing the control means.

KARL NÜCHTERLEIN.